United States Patent [19]

Mitra

[11] Patent Number: 5,551,057
[45] Date of Patent: Aug. 27, 1996

[54] CELLULAR MOBILE RADIO SYSTEM POWER CONTROL

[75] Inventor: Debasis Mitra, Summit, N.J.

[73] Assignee: Lucent Technologies Inc., Murray Hill, N.J.

[21] Appl. No.: 255,607

[22] Filed: Jun. 8, 1994

[51] Int. Cl.⁶ .................................................. H04Q 7/22
[52] U.S. Cl. .......................... 455/33.1; 455/56.1; 455/69; 370/95.3
[58] Field of Search .............................. 455/54.1, 54.2, 455/56.1, 69, 70, 226.2, 226.3, 33.1; 370/17, 95.1, 95.3; 375/200

[56] References Cited

U.S. PATENT DOCUMENTS

| 4,495,648 | 1/1985 | Giger | 455/69 |
|---|---|---|---|
| 4,777,653 | 10/1988 | Bonnerot et al. | 455/73 |
| 5,241,690 | 8/1993 | Larsson et al. | 455/54.1 |
| 5,267,262 | 11/1993 | Wheatley, III | 375/200 |
| 5,333,175 | 7/1994 | Ariyavisitakul et al. | 455/69 |
| 5,357,513 | 10/1994 | Kay et al. | 370/95.3 |
| 5,386,589 | 1/1995 | Kanai | 455/69 |

OTHER PUBLICATIONS

Aein, J. M., "Power Balancing in Systems Employing Frequency Reuse," COMSAT Technical Review, vol. 3, No. 2, Fall 1973, pp. 277–299.

Bambos, N., Pottie, G. J., "Power Control Based Admission Policies in Cellular Radio Networks," Third WINLAB Workshop, 1992, 10 pages.

Beck, R., Panzer, H., "Strategies for Handover and Dynamic Channel Allocation in Micro–Cellular Mobile Radio Systems," IEEE Journal, 1989, pp. 178–185.

Bertsekas, D. P., Tsitsiklis, J. N., Parallel and Distributed Computation, Prentice Hall, 1989, pp. 481–489.

Chazan, D., Miranker, W., "Chaotic Relaxation," Linear Algebra and Its Applications, 1969, pp. 199–222.

Fiedler, M., Ptak, V., "On Matrices with Non–Positive Off–Diagonal Elements and Positive Principal Minors," Czech. Math. J., vol. 12, No. 3, 1962, pp. 382–400.

Foschini, G. J., Miljanic, Z., "A Simple Distributed Autonomous Power Control Algorithm and its Convergence," IEEE Transactions on Vehicular Technology, vol. 42, No. 4, Nov. 1993, pp. 641–646.

Gantmacher, F. R., The Theory of Matrices, vol. 2, Chelsea Publishing Company, 1971, pp. 50–56.

Gilhousen, K. S., Jacobs, I. M., Padovani, R., Viterbi, A. J., Weaver, Jr., L. A., Wheatley III, C. E., "On the Capacity of a Cellular CDMA System," IEEE Transactions on Vehicular Technology, vol. 40, No. 2, May 1991, pp. 303–312.

Grandhi, S. A., Vijayan, R., Goodman, D. J., "A Distributed Algorithm for Power Control in Cellular Radio Systems," Wireless Information Network Laboratory (WINLAB), Rutgers, Piscataway, NJ, Jul. 9, 1992, 9 pages.

Hanly, S. V., "Information Capacity of Radio Networks," King's College, University of Cambrige, Aug. 1993, 225 pages.

Lee, W. C. Y., "Mobile Communications Design Fundamentals," A Wiley–Interscience Publication, John Wiley & Sons, Inc., pp. 181–186, 297, 298, 303–315.

(List continued on next page.)

Primary Examiner—Edward F. Urban

[57] ABSTRACT

The present invention discloses a method of and apparatus for regulating the power of signals transmitted by transmitting units, such as mobiles or base stations, that are using the same channel in a cellular radio system. An iterative process is disclosed in which the demands of synchrony and coordination among the transmitting units are relaxed. The power of the signals converges at a geometric rate to optimal transmission powers, where the optimal transmission powers are defined as the minimum powers required to maintain the ratio of carrier power to co-channel interference power at least as large as some pre-fixed target value obtained from quality of service considerations. As a result of relaxing the demands of synchrony and coordination, expensive clock or timing mechanisms are not required, thereby reducing the costs of power control.

23 Claims, 7 Drawing Sheets

OTHER PUBLICATIONS

Lubachevsky, B., Mitra, D., "A Chaotic Asynchronous Algorithm for Computing the Fixed Point of a Nonnegative Matrix of Unit Spectral Radius," Journal of the Association for Computing Machinery, vol. 33, No. 1, Jan. 1986, pp. 130–150.

Nettleton, R. W., Alavi, H., "Power Control for a Spread Spectrum Cellular Mobile Radio System," Proceedings of the IEEE Vehicular Technical Conference, VTC–83, 1983, pp. 242–246.

Seneta, E., *Nonnegative Matrices and Markov Chains* (2d ed.), George Allen and Unwin, 1973, pp. 30–33.

Zander, J., "Performance of Optimum Transmitter Power Control in Cellular Radio Systems," IEEE Transactions on Vehicular Technology, vol. 41, No. 1, Feb. 1992, pp. 57–62.

Zander, J., "Distributed Cochannel Interference Control in Cellular Radio Systems," IEEE Transactions on Vehicular Technology, vol. 41, No. 3, Aug. 1992, pp. 305–311.

CELLULAR MOBILE RADIO SYSTEM POWER CONTROL

FIELD OF THE INVENTION

The present invention relates generally to power control in cellular radio systems. More specifically, the present invention relates to a method and apparatus for regulating the power of signals transmitted by cellular radio transmitting units using the same channel.

BACKGROUND OF THE INVENTION

A cellular mobile radio system may comprise a plurality of cells each of which has at least one base station for simultaneous communication with a number of mobile stations or units. When the mobile stations are used for calling purposes, for example, signal transmission is effected between a base station and the mobile stations served by the base station in the cell by transmitting and receiving radio signals.

Efficient channel reuse is of particular importance in the design of large high-capacity cellular radio systems such as systems using frequency division multiple access (FDMA) or time division multiple access (TDMA) techniques. In a multi-cell environment, however, co-channel interference caused by frequency reuse is the single most limiting factor on the system capacity. Specifically, the attenuation suffered by a signal over distance is insufficient to isolate the cells from each other. One means for controlling co-channel interference which has gained increasing attention is the use of transmitter power control. The basic idea is to adjust the transmitter power in each base-mobile link so that the interference levels at other receiver locations are minimized. Maintaining sufficient transmission quality on the communication links, however, is a critical constraint. If, for example, a signal transmitted by a mobile station arrives at the base station receiver at a power level that is too low, the bit error rate may be too high to allow high quality communication. If, however, a signal transmitted by a particular mobile station arrives at the base station receiver at a power level that is too high, this high power interferes with the signals transmitted by other mobile stations that are sharing the same channel. System capacity, therefore, can be maximized if the transmitter power of each mobile station is controlled such that the transmitter signal arrives at the base station at the minimal signal to noise interference ratio which allows acceptable data recovery.

Early work on power control discovered that a good measure of quality in cellular systems design is the carrier-to-interference ratio (CIR). In an article by Aein, the concept of CIR balancing in the context of satellite systems is introduced. J. M. Aein, "Power Balancing in Systems Employing Frequency Reuse," COMSAT Tech. Rev., vol. 3, no. 2, pp. 277–300 (1973). This article and all other publications referred to herein are incorporated by reference. The power balancing approach aims at achieving the same CIR in all communication links. In another article by R. W. Nettleton and H. Alavi, "Power Control for Spread-spectrum Cellular Mobile Radio System," Proc. IEEE Vehic. Tech. Conf., VTC-83, pp. 242–246 (1983), the balancing concept is used in the context of cellular radio.

Recent work has emphasized distributed, or local, control. In a distributed power control system, the power level of each transmitter is guided, using local measurements only, so that eventually all receivers meet the specified CIR requirements. Distributed power control is of special interest because the alternative of centralized power control involves added infrastructure and network vulnerability.

Mathematical analysis in the area of distributed power control has followed two distinct paths. The first is concerned with maximizing the minimum CIR. For example, J. Zander, in "Performance of Optimum Transmitter Power Control in Cellular Radio Systems," IEEE Trans. Vehic. Tech , vol 41, no. 1, pp 57–62 (1992), presents an iterative scheme, that operates in the absence of receiver noise, to evolve the power of the signals of a specified number of users to achieve the greatest CIR that they are jointly capable of achieving. This approach, however, neglects receiver, thermal and external noise, and the vector of transmitter powers converges to within a constant of proportionality.

The second approach recognizes the presence of noise and sets as its goal the requirement that the CIR of all links not be less than some pre-fixed target, which is determined by quality of service considerations. For example, G. J. Foschini, in "A Simple Distributed Autonomous Power Control Algorithm and Its Convergence," IEEE Trans. Vehic. Tech , vol 42, no. 4, pp 641–646 (1993), provides a synchronous algorithm by which all users concurrently proceed in an iterative manner to reset their respective power levels to the level that each one needs to have acceptable performance. Each user proceeds as if the other users were not going to change their power levels. The distributed synchronous algorithm converges exponentially.

One requirement of the model discussed by Foschini is synchrony among the various users. The cost of power control in a cellular radio system, however, increases when the demands of synchrony are imposed. In order to achieve synchrony, expensive clock or timing mechanisms must be used. Alternatively, less expensive clock mechanisms may be used in conjunction with a form of feedback such as phase-locked loops to achieve synchronous functioning. In either case, the cost of obtaining power control increases as the degree of synchrony rises.

Systems which include methods for implementing power control in cellular radio systems have been proposed. U.S. Pat. No. 5,267,262 discloses a power control system for a cellular mobile telephone system using a code division multiple access (CDMA) technique. It includes means for controlling the power generated by a particular mobile unit and received at the particular base station communicating with that mobile. The mobile unit transmitted power is measured as received at the base station. The measured signal strength is compared to a desired signal strength level for that particular mobile. A power adjustment command is generated and sent to the mobile unit. In response to the base station power adjustment command, the mobile unit increases or decreases the mobile unit transmitter power by a predetermined amount, nominally less than 1 dB. Systems using CDMA, however, do not use channels. Thus, although the use of power control to balance the goals of high system capacity and high transmission quality is important, the notion of efficient channel reuse is not relevant to systems using CDMA techniques.

U.S. Pat. No. 5,241,690 also discloses a method for regulating power in a digital mobile telephony system. The output power of a mobile unit or base station is regulated to maintain the transmission power at an optimum level. The measured values of signal strength and transmission quality are collected, and their mean values are calculated. An anticipated value of signal strength and transmission quality is calculated at a future point in time. The transmission power at a future time is regulated on the basis of these anticipated values. The transmission power is increased when the anticipated transmission quality is less than that desired and is decreased when the anticipated quality is higher than the highest permitted quality or when the anticipated signal strength is greater than the maximum permitted value.

SUMMARY OF THE INVENTION

The present invention discloses, in a digital mobile radio system, a method and apparatus for regulating the power of signals transmitted from a plurality of cellular radio transmitting units where each transmitting unit is communicating with a corresponding cellular radio receiving station via the same digital radio channel. The method of the present invention comprises the steps of: performing an updating routine with respect to each one of said plurality of transmitting units and repeatedly performing said updating routine with respect to each one of said plurality of transmitting units in a manner not requiring synchrony or coordination among the plurality of transmitting units. The updating routine comprises the steps of calculating a signal path gain between the transmitting unit and the corresponding receiving stations and measuring a co-channel interference power level at the corresponding receiving station. The updating routine also comprises the step of calculating the product of the reciprocal of the signal path gain, the co-channel interference power level, and a pre-fixed value which corresponds to a minimum target value of the ratio of a received carrier power and a co-channel interference power. The updating routine further comprises the step of regulating the power of signals transmitted by the transmitting unit according to the value of the product.

Other features and advantages of the present invention will be readily apparent by reference to the following detailed description and accompanying drawings.

DETAILED DESCRIPTION OF THE INVENTION

Figure 1:
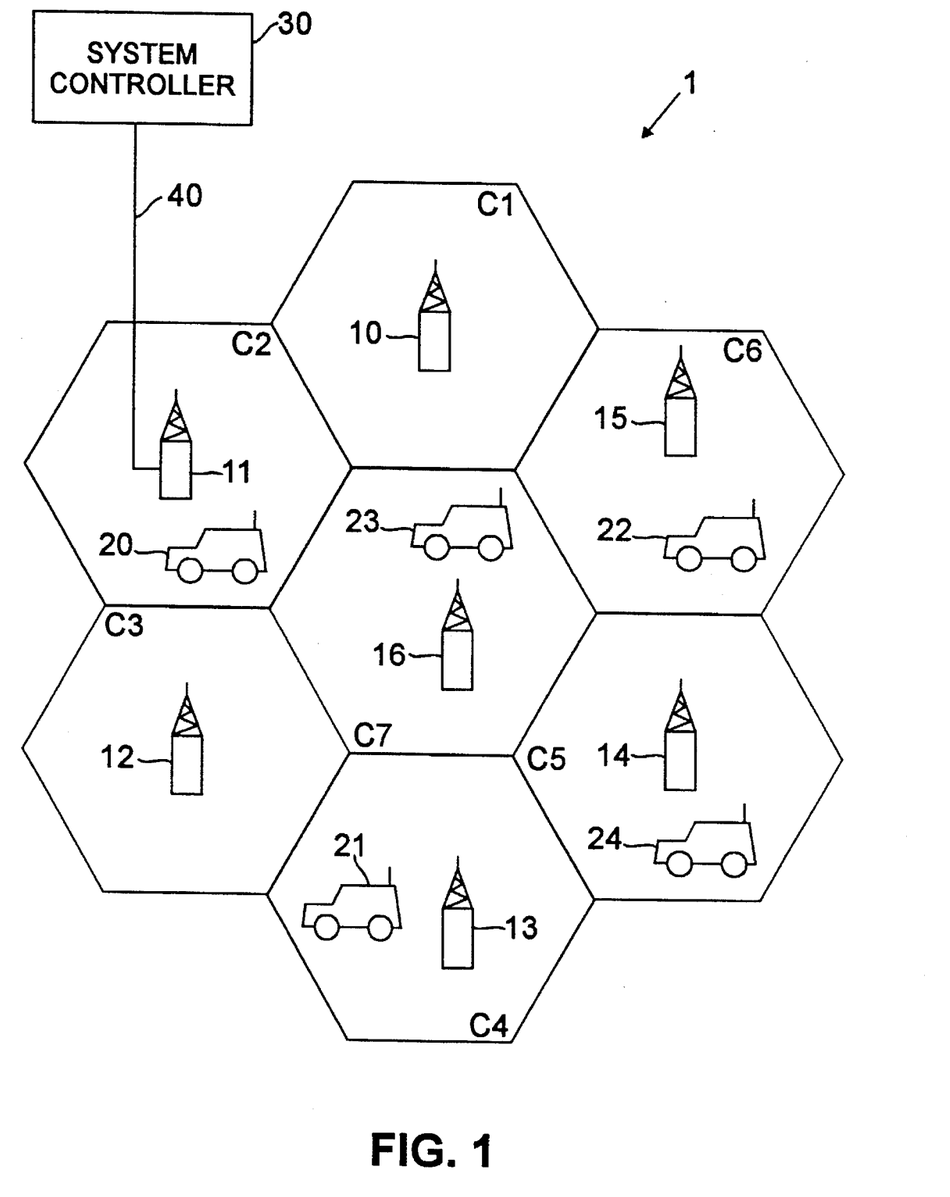
FIG. 1 shows an exemplary cellular mobile radio system in which the method of the present invention is particularly advantageous.

FIG. 1 shows an exemplary mobile cellular radio system 1 in which the method of the present invention is particularly advantageous. FIG. 1 illustrates seven cells, C1–C7, which have corresponding terrestrial base stations 10–16. The system 1 of FIG. 1 also includes five mobile stations or mobiles 20–24 which can move within a cell as well as from one cell to another. The mobiles 20–24 may be, for example, portable cellular telephone devices. Although the system 1 in FIG. 1 shows only seven base stations and five mobile stations, a cellular system such as the system 1 typically may have hundreds of base stations serving tens of thousands of mobile telephones. The mobile system 1 also includes at least one duplex radio channel which is common to all the base stations 10–16 and the mobile stations 20–24. The actual implementation of the channel may use, for example, a frequency division multiple access (FDMA) technique or a time division multiple access (TDMA) technique. The duplex channel allows both directions on the telephone conversation to be active simultaneously. It is usually provided by using one frequency band for the outbound links or transmissions from transmitters at the base stations to receivers at the mobile units, and a different frequency band for the inbound links or transmissions from transmitters at the mobile units to receivers at the base stations.

The system 1 of FIG. 1 also includes a system controller and switch 30. The controller 30 is connected to the base stations 10–16 by a suitable communication medium such as dedicated telephone lines, optical fiber links or radio frequency communications. For clarity of presentation, only one connection 40 is shown connecting the system controller 30 to the base station 11. It is to be understood, however, that similar connections exist between the controller 30 and the remaining base stations 10 and 12–16. The controller 30 controls the routing of telephone calls from a public switched telephone network to the appropriate base station for transmission to the appropriate mobile station. The controller 30 also controls the routing of calls from the mobile stations to the public switched telephone network via at least one base station.

Many digital cellular mobile radio systems are known to those skilled in the art. Similarly, base stations and mobile stations for use in digital mobile radio systems are well-known in the art. Those persons not skilled in the art, however, are referred to EIA/TIA, Cellular System, Dual-Mode Mobile Station-Base Station Compatibility Standard, IS-54, for information on digital mobile radio stations which use TDMA.

The present invention relates to a method of controlling or regulating the power signals transmitted between mobile stations and base stations to maintain the power levels at optimum levels as defined below. A general performance objective of the present invention is to minimize the transmitters' powers while maintaining the carrier-to-interference ratio (CIR) for each link at least as large as some pre-fixed target value, ρ, obtained from quality of service considerations. Here, the CIR is defined as the carrier power received at a particular base station or mobile unit divided by the total co-channel interference power (CCIP) at that base station or mobile unit. The smallest transmitters' powers that satisfy the performance objective are the optimal power levels to be transmitted by the transmitters.

In the discussion that follows, the inbound link is considered. It is to be understood, however, that this discussion is merely exemplary, and that the method of the present invention can be applied to the outbound link as well. Therefore, while a mobile, such as the mobile 20, may be referred to as a transmitting unit, and a base station, such as the base station 11, may be referred to as a receiving station in the discussion that follows, it is to be understood that the roles of the mobiles and base stations may be reversed and that a mobile and a base station may both serve as either a transmitting unit or a receiving station. It is further assumed, for the purpose of illustration, that each of the mobile units 20–24 in FIG. 1 is communicating with a different one of the base stations 10–16 at some time $t_0$ on the same channel. The mobile 20, for example, may be communicating with the base station 11. Similarly, each of the mobiles 21, 22, 23 and 24 may be communicating with the base stations 13, 15, 16 and 14, respectively. At time $t_0$, the mobile 20 is transmitting to the base station 11 at an average power $P(t_0)$. The carrier power received at the base station 11 from the mobile 20 may be written as $C=G \times P(t_0)$, where G is the inbound signal path gain for the link between the mobile 20 and the base station 11.

Figure 2:
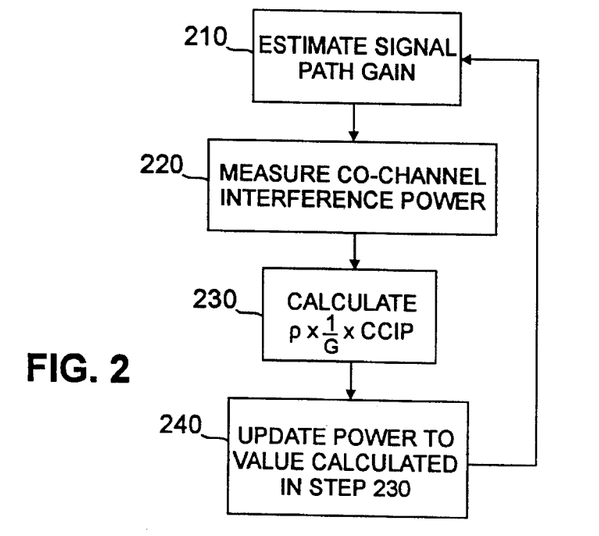
FIG. 2 is a flow chart showing the steps of an updating routine for regulating the power of signals transmitted by a mobile in a cellular radio system according to the method of the present invention.

FIG. 2 is a flow chart showing the steps of an updating routine for regulating the transmission power of a mobile or other transmitting unit according to the method of the present invention. The mobile station whose transmission power is to be regulated or is being regulated will be referred to as the updating mobile in the discussion that follows. In accordance with the method of the present invention, the inbound signal path gain, G, between the updating mobile, for example, the mobile 20, and the base station with which it is communicating, here the base station 11, is calculated in step 210. As indicated in step 220, the co-channel interference power level, CCIP, at the base station 11 is also measured or calculated. Next, as shown in step 230, the product of the pre-fixed target value of the CIR, the reciprocal of the calculated signal path gain and the measured co-channel interference power level, is calculated. The resulting value of the product is the power level at which the mobile 20 should be set to transmit. In step 240, therefore, the updating mobile 20 updates the power at which it transmits signals to the value calculated in the preceding step. As a result of this power adjustment, at a time $t_1$, subsequent to time $t_0$, the transmission power of the mobile 20 is updated. An update of the mobile's transmission power may result in an increase, a decrease, or no change in its transmission power. The updating routine as shown in FIG. 2 is repeatedly performed with respect to the mobile 20, without imposing a requirement of synchrony as explained below.

Iterations of the steps 210–240 are performed with respect to each of the other mobiles 21–24 as well. The power updating routine is performed with respect to each mobile or transmitting unit without imposing the requirements of synchrony and coordination among the various mobiles or transmitting units, as also explained further below.

Figure 3A:
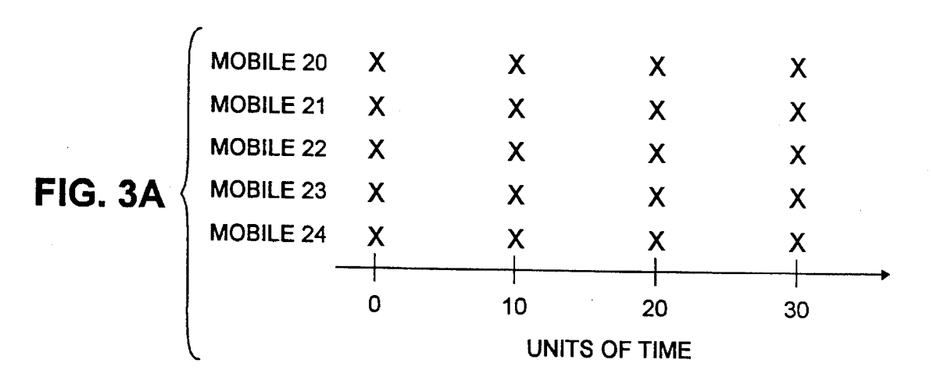
FIG. 3A shows an exemplary timing diagram in which the powers of signals transmitted by a plurality of mobiles are regulated in a synchronous and coordinated manner.
Figure 3B:
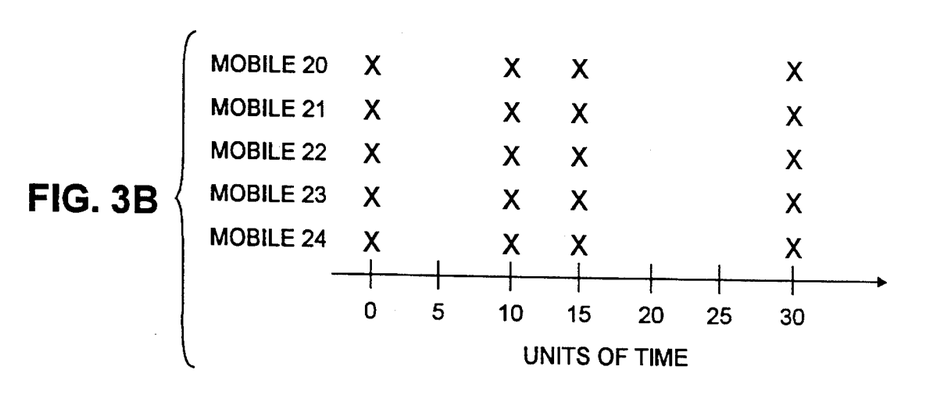
FIGS. 3B through 3E show exemplary timing diagrams in which the powers of signals transmitted by a plurality of mobiles are regulated in a manner not requiring synchrony among the mobiles.

FIG. 3A shows the synchronous situation in which all the mobiles 20–24 concurrently update their respective transmission powers at the same time, and where the duration between successive power updates remains the same. In FIG. 3A, FIG. 3B, FIG. 3C, FIG. 3D and FIG. 3E, "x" marks a time at which the transmission power of a particular transmitting unit is updated or regulated.

Several relaxations may be made to the demands of synchrony and coordination shown in FIG. 3A. One such relaxation may be made by removing the requirement that the duration between successive power updates or between successive cycles of the updating routine remains constant. This situation is shown graphically in FIG. 3B, in which the duration between successive power updates varies. While the mobiles 20–24 continue to coordinate their respective transmission power updates, the duration between successive power updates need not remain the same.

Figure 3C:
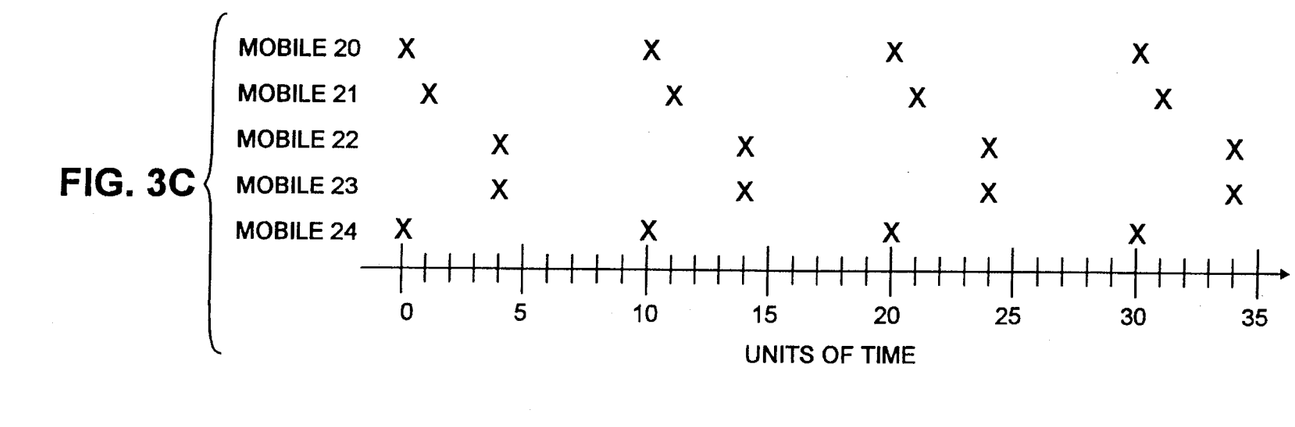
Figure 3D:
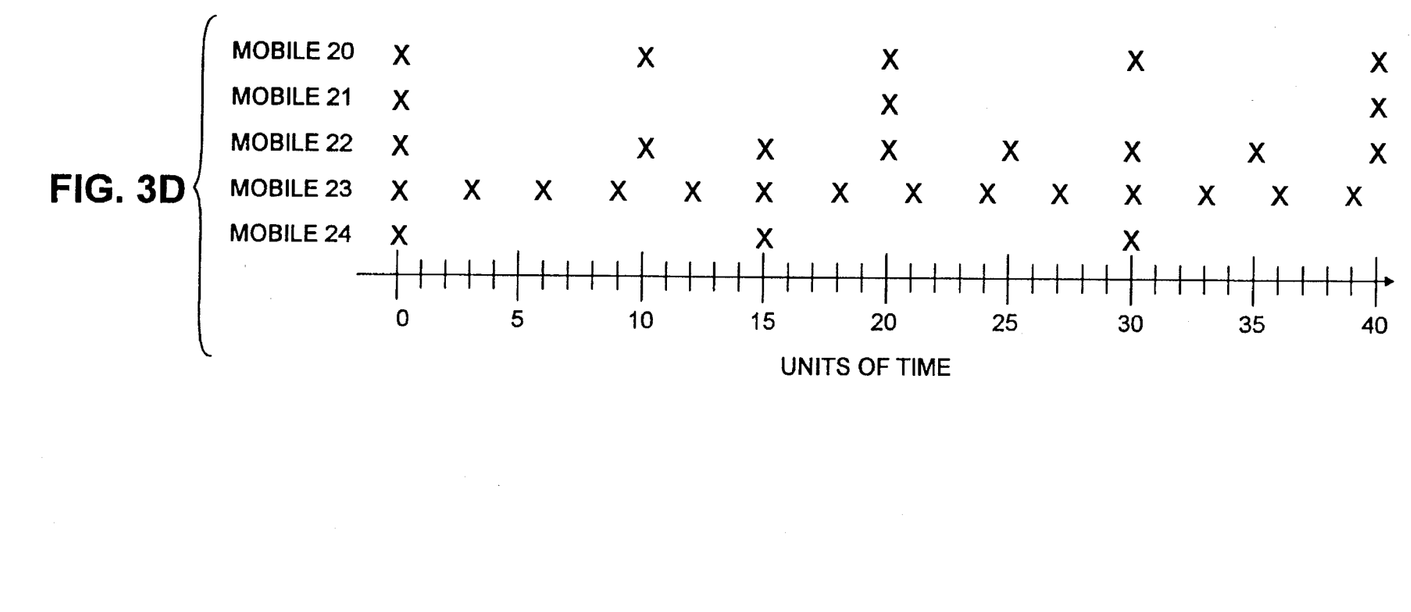

Another relaxation may be made by removing the requirement that all the mobiles 20–24 concurrently update their respective transmission powers as shown graphically in FIG. 3C. While each of the mobiles 20–24 updates its transmission power at the same constant rate as the other mobiles, there is, in effect, a phase delay between the power updates of one mobile and at least one other mobile. Furthermore, the phase delays among the mobiles 20–24 may be different.

Yet another relaxation may be made to the demands of synchrony by removing the requirement that all the mobiles 20–24 update their respective transmission powers at the same rate, or that repeated performance of the updating routine occur at the same rate for all the mobiles 20–24. This situation is shown graphically in FIG. 3D. With respect to a particular mobile, the rate of power updates remains constant. The rate of transmission power updates, however, may vary from one mobile to another mobile.

Figure 3E:
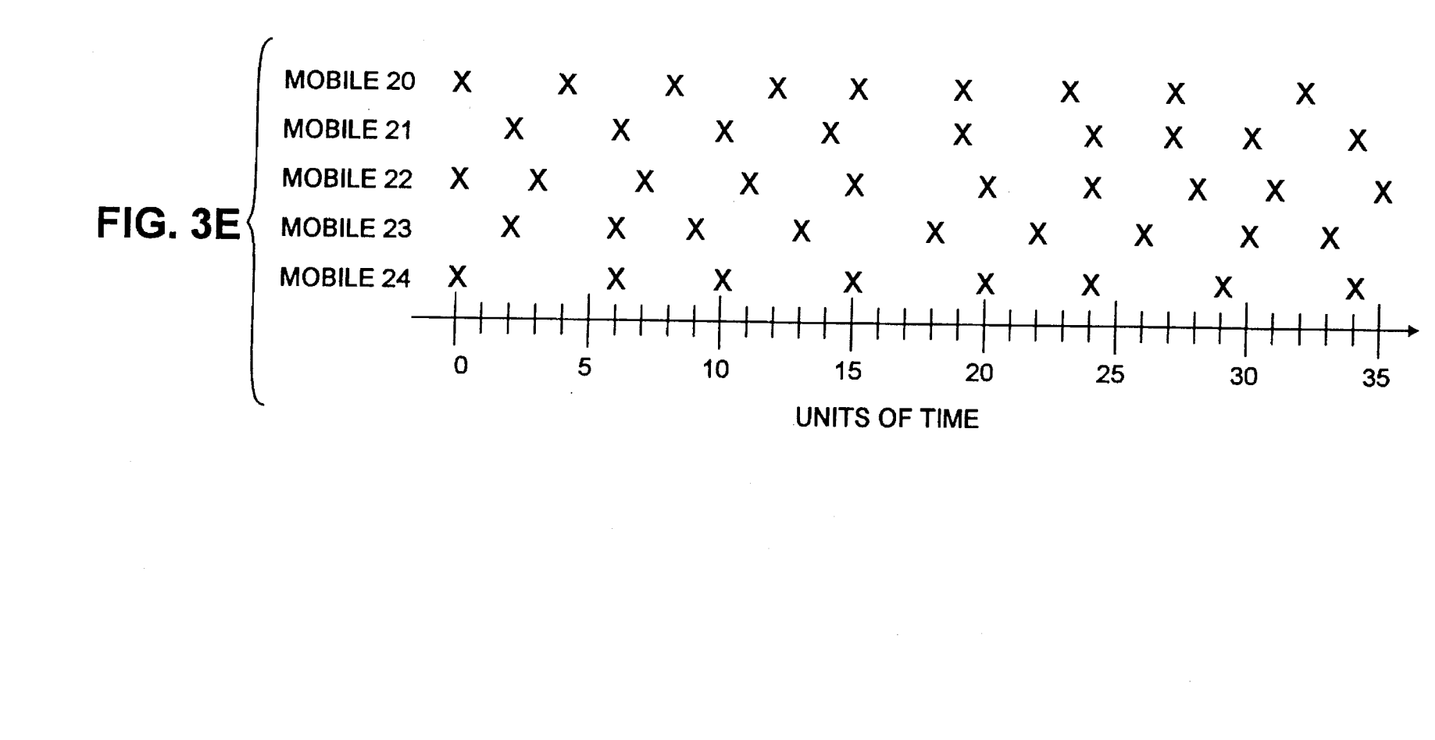

Of course, it is to be understood that other relaxations upon the demands of synchrony and coordination may be made consistent with the scope of the present invention. In particular, any combination of the relaxations set forth above, such as the situation shown in FIG. 3E, is permitted.

It should also be understood that updating the transmission powers or performing the updating routine in an asynchronous manner does not require that the duration between successive power updates be completely random or that there be no attempt at coordination among the various transmitting units. In particular, power updates ad described herein preferably occur at a rate of approximately once every millisecond. This rate permits tracking of signal fading processes for vehicles moving the range of 20–50 miles per hour for 850 MHz band mobile communications. There may, therefore, be intervals of time during which the duration between successive power updates in a particular transmitting unit remains substantially constant or during which there is substantial coordination among the various transmitting units. Updating the transmission powers or performing the updating routine in an asynchronous manner requires only that, during some time interval, there is not perfect synchrony and coordination among the transmitting units as shown in FIG. 3A. Furthermore, it also should be understood that the target value of the CIR, obtained from quality of service considerations, may be different for each receiving station.

One feature and advantage of the method of modifying or updating the transmission power levels of the mobiles according to the steps 210–240 is that the power levels converge at a geometric rate to the optimum power levels as set forth, above even when the demands of synchrony and coordination are relaxed. This situation permits an improvement in the system capacity while providing for each mobile or transmitting unit to transmit signals at a power level that allows acceptable data recovery.

Another important feature of the present method of power control is that by relaxing the demands of coordination and synchrony among the various transmitting units, it relaxes the need for strict clock synchronization. As indicated above, one implication of relaxing the need for strict clock synchronization is lower costs for mobiles and base stations, because costly clock or timing mechanisms are no longer required.

Yet another feature of the present method is that convergence takes place even where unpredictable bounded propagation delays occur such as may be common in satellite communications. For example, suppose all the mobiles using a particular channel have updated their respective powers once. A particular mobile may update its power a second time before the effects of the first power modifications by the other mobiles are received in the form of interference power at the base station to which the particular mobile is transmitting. The particular mobile, therefore, regulates its transmission power based upon an interference power measurement at the base which does not reflect the previous updates in the power levels of all the other mobiles. Nevertheless, the transmission powers converge to the optimal power levels at a geometrically fast rate. It should be understood, however, that smaller bounds in propagation delay result in a faster rate of geometric convergence.

Mathematical Analysis of Convergence Properties

The convergence properties of the method of the present invention are demonstrated below.

The performance objective is to achieve $$(CIR)_i \geq \rho \quad (i=1,2,\ldots,M) \tag{1}$$

where $(CIR)_i$ is the CIR of the ith link, $\rho$ is the prefixed target value obtained from quality of service considerations, and M is the number of mobile-to-base links using the same channel. In equation (1) above, $$(CIR)_i = \frac{G_{ii}P_i}{\left[\sum_{j \neq i} G_{ij}P_j + v_i\right]} \tag{2}$$

where $P_i$ is the power transmitted by the ith mobile, $G_{ij}$ is the gain between the ith base and the jth mobile, and $v_i$ is the power of the local additive external noise. The performance objective defined by equation (1) may be combined with equation (2) and stated in matrix form as follows:

$$[I-\rho F]P \geq u, \tag{3}(a)$$

$$P \geq 0, \tag{3}(b)$$

where P is the vector of transmitter powers, I is the M×M identity matrix, F is the following nonnegative matrix, $$F_{ij}=0 \quad \text{if } i=j$$

$$F_{ij}=G_{ij}/G_{ii} \quad \text{if } i \neq j$$

and u is the vector with elements $$u_i = \rho v_i / G_{ii} \quad (1 \leq i \leq M).$$

Assuming that F is irreducible and that u is element-wise positive, in other words, u>0, a solution to (3) is feasible if at least one solution vector P exists.

In equation (3)(a), the matrix [I−ρF] has nonpositive off-diagonal terms. Such matrices appear in a myriad of applications and have been widely studied. The following statements follow from standard results and arguments.

The Perron-Frobenius eigenvalue of the nonnegative, irreducible matrix F, which is the eigenvalue of maximum modulus, is real, positive and simple. Denoting it by $\tau_F$, the corresponding eigenvector w is element-wise positive, in other words, $$F\omega = \tau_F \omega, \quad \omega > 0. \tag{4}$$

Also, the following statements are equivalent:

(i) $\rho \tau_F < 1$;
(ii) A solution to equation (3) exists;
(iii) $[I - \rho F]^{-1}$ exists and is element-wise positive.

If the statements (5) hold, then a particular solution to equation (3) is P*, where $$P^* = [I-\rho F]^{-1} u. \tag{6}$$

This solution is Pareto optimal in that any other P which also satisfies (3) requires at least as much power from every transmitter and at least one transmitter's power to be greater, in other words, $P \geq P^*$.

Correspondingly, for the power distribution in (6), the CIR of every link is $\rho$, in other words, as low as is permitted by the quality of service requirement in equation (1).

The model for asynchronous power modifications is the following:

$$P_i(n+1) = \rho \sum_{j \neq i} F_{ij} P_j(n-d(n,i,j)) + u_i \quad \text{if } i \in U(n) \tag{7}$$

$$P_i(n+1) = P_i(n) \quad \text{if } i \notin U(n).$$

Here n is an index for the "updates" in the user power. An update is the event of at least one mobile modifying its power. The set U(n) denotes the collection of indices of mobiles making concurrent updates, and hence U(n) is a subset of $(1, 2, \ldots, M)$. Thus an update may range from just one mobile modifying its power to as many as all mobiles concurrently updating their respective powers. Note that the elapsed time between successive updates is arbitrary.

In the equation (7) the "delay terms" d(n, i, j) are nonnegative, bounded integers. In the interval between the nth and the (n+1)th update of the power of the ith link, various other links may have their powers updated, possibly more than once. Let j be the index of any such link. The scenario is mapped into the model in (7) by making d(n, i, j) equal to the number of such updates. Similarly, propagation delay effects are modelled by appropriate choice of delays terms.

It is further assumed that:

(A1) $P_i(0) > 0 \quad (i=1,2,\ldots,M)$;

(A2) the delay terms are uniformly bounded, in other words, $$d(n,i,j) \leq d < \infty \quad (n \geq 0; 1 \leq i \leq M; 1 \leq j \leq M); \text{ and}$$

(A3) there exists a finite integer s such that every mobile updates its power at least once in every s consecutive updates.

The general idea of the proof below is that diagonal dominance by rows holds for the extended system in which the dimension of the state vector is increased to take into account the worst case delay, d. Diagonal dominance gives the natural Lyapunov function in equation (9) below.

The proposition claimed is that if the statements (5) hold in addition to the assumptions (A1), (A2) and (A3), then the convergence of the synchronous model in the equation (7) is geometrically fast. In other words, $$\|X_d(n)\| \leq c(\rho \tau_F)^t \quad (n=0, 1, 2, \ldots) \tag{8}$$

where the norm is defined in terms of the Perron-Frobenius eigenvector $\omega$:

$$\|x_d(n)\| = \max_{0 \leq \delta \leq d} \max_{1 \leq i \leq M} |P_i(n-\delta) - P_i^*|/\omega_i, \tag{9}$$

$$t = \lfloor n/(d+s) \rfloor \text{ and } c = \|x_d(0)\|.$$

The convergence properties can be demonstrated by the following proof. From equation (7) and the definition of P* in equation (6), it follows that $$x_i(n+1) = \rho \sum_{j \neq i} F_{ij} x_j(n - d(n,i,j)) \quad \text{if } i \in U(n) \quad (10)$$

$$x_i(n+1) = x_i(n) \quad \text{if } i \notin U(n)$$

where, $$x_i(n) \underline{\Delta} P_i(n) - P_i^* \quad (i=1, 2, \ldots M); (n=0, 2, 1, \ldots). \quad (11)$$

If $i \in U(n)$, then $$|x_i(n+1)| \leq \rho \sum_{j \neq i} F_{ij} \frac{|x_j(n - d(n,i,j))|}{\omega_j} \omega_j$$

$$\leq \rho \|x_d(n)\| \sum_{j \neq i} F_{ij} \omega_j$$

$$\leq \rho \tau_F \|x_d(n)\| \omega_i.$$

This last equation can be re-written as $$|x_i(n+1)|/\omega_i \leq \rho \tau_F \|x_d(n)\|. \quad (12)$$

Also, $$|x_i(n+1)|/\omega_i \leq \|x_d(n)\| \quad \text{if } i \notin U(n).$$

Hence, $\|x_d(n)\|$ is non-increasing with increasing n.
Next, it can be shown that $$\max_{1 \leq i \leq M} \{|x_i(n')|/\omega_i\} \leq \rho \tau_F \|x_d(n)\| \quad (0 \leq n \leq n' - s). \quad (13)$$

In order to demonstrate the equation (13), note that the power of the ith link must be updated at least once in the series of consecutive updates [n'−s, n'−1]. If the last update is indexed τ, then, $$|x_i(n')|/\omega_i = |x_i(\tau=1)|/\omega_i \leq \rho \tau_F \|x_d(\tau)\| \leq \rho \tau_F \|x_d(n)\|.$$

From equation (13) and the definition in equation (9), $$\|x_d(n')\| \leq \rho \tau_F \|x_d(n)\| \quad (0 \leq n \leq n' - (d+s)). \quad (14)$$

The proposition claimed in equation (8) and equation (9) follows directly from equation (14).

PREFERRED EMBODIMENTS

Figure 4:
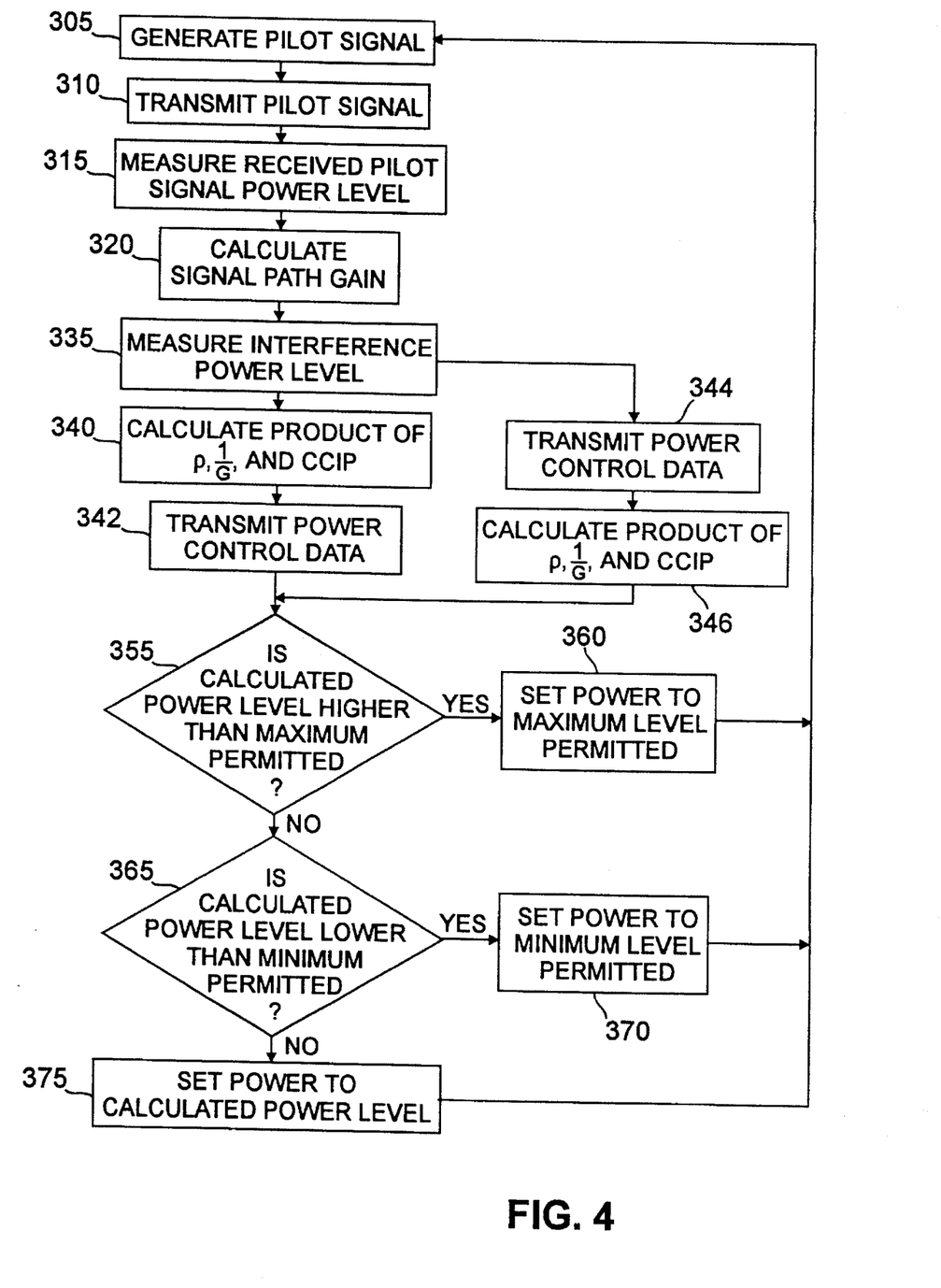
FIG. 4 is a flow chart illustrating a preferred implementation of an updating routine according to the method of the present invention.

FIG. 4 is a flow chart illustrating a preferred implementation of the method of the present invention. One exemplary way of estimating the signal path gain involves the use of pilot signals, which are well known in the art. In step 305, the mobile 20, for example, generates a pilot signal at a predetermined power level. In step 310, the pilot signal then is transmitted from the mobile 20, and received at the base station 11 where, in step 315, its power level is measured. In step 320, the base station 11 uses this measurement, together with the predetermined power level of the pilot signal transmitted from the mobile 20 and an antenna gain of the base station 11, to calculate the signal path gain by multiplying together the reciprocal of the predetermined power level of the pilot signal transmitted by the mobile 20, the received power measured in the step 315, and the reciprocal of a base station antenna gain.

In step 335, the co-channel interference power level (CCIP) at the base station 11 is measured or calculated. In step 340, the product of the pre-fixed target value of the CIR, the reciprocal of the calculated path gain, and the measured co-channel interference power level, is calculated. Next, in step 342, power control data, which includes the value of the calculated product, is transmitted to the mobile 20. Alternatively, instead of performing the steps 340 and 342 as just explained, in step 344, the base station 11 first transmits power control data to the mobile 20. This data includes a calculated signal path gain, a measured co-channel interference power level, and the pre-fixed target value of the CIR. Then, in step 346, the mobile 20 calculates the product of the pre-fixed target value of the CIR, the reciprocal of the calculated path gain, and the power level of the measured co-channel interference. The difference between the two alternatives is primarily in whether the product is calculated by the base station 11 or the mobile 20.

In step 355, the mobile unit 20 determines whether the calculated product is higher than a maximum permissible power level for that mobile unit. If the calculated product is higher than the maximum permissible power level, then the mobile's power is modified or updated to the maximum permissible level as shown in step 360. If the calculated product is not higher than the maximum permissible power value, then, in step 365, the mobile unit 20 determines whether the calculated product is lower than a minimum permissible power level for that mobile unit. If the calculated product is lower than the minimum permissible power level, then the mobile's power is updated or modified to the minimum permissible power level as shown in step 370. Finally, in step 375, if the calculated product is not lower than the minimum permissible power level, the mobile 20 modifies its transmission power level to the calculated product. Once the mobile 20 modifies or updates its transmission power level in any of the steps 360, 370, or 375, the entire process is repeated starting at the step 305. As indicated above, each of the other mobile units 21–24 also regulates the power of signals it transmits according to this routine.

Figure 5:
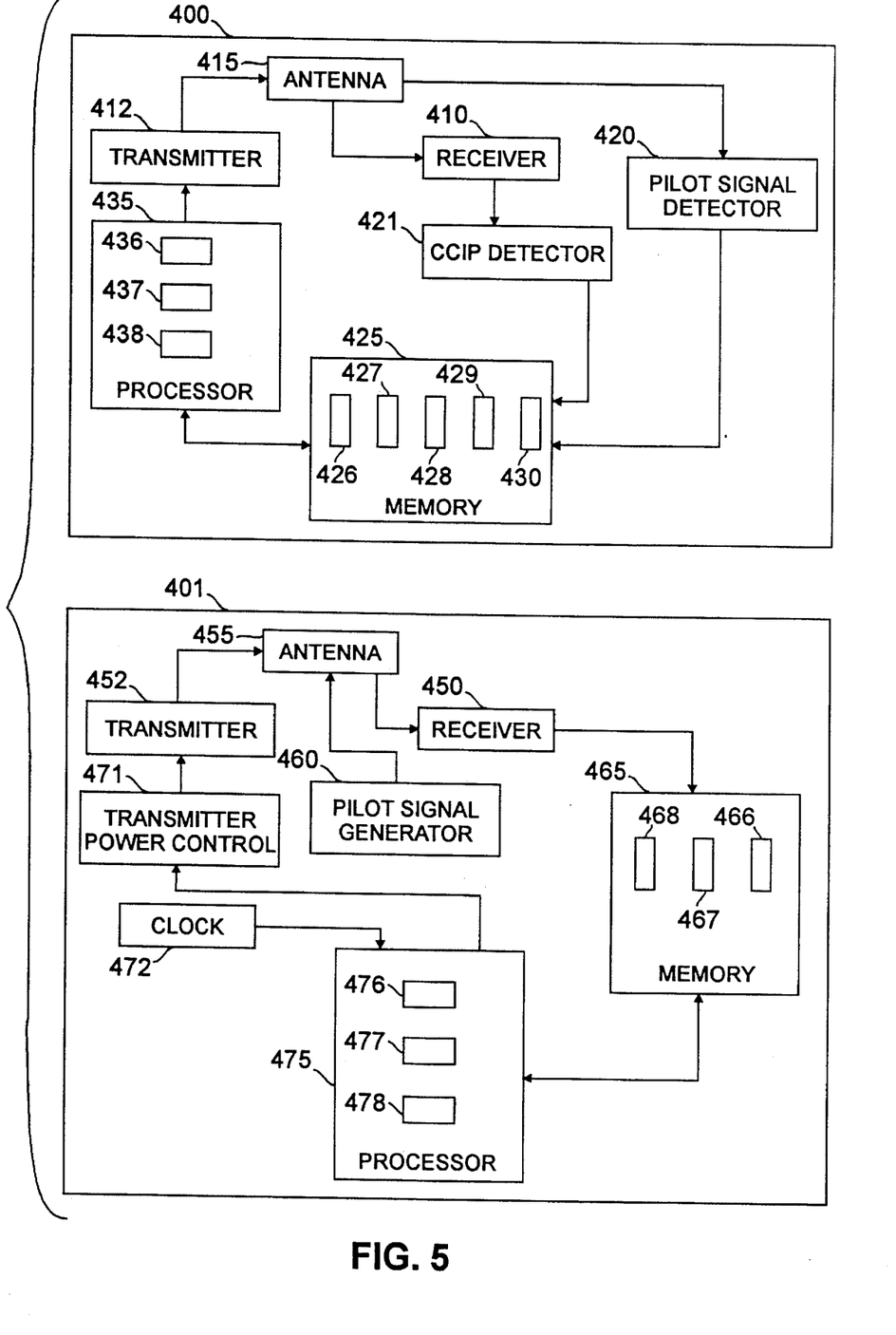
FIG. 5 shows a first embodiment of an exemplary mobile and base station pair according to the present invention.

FIG. 5 illustrates a first embodiment of an exemplary pair of transceivers 400 and 401 for implementing the present invention. Each of the pair of transceivers 400 and 401 may be one of the base stations and mobile units in the system 1, respectively. For example, the transceiver 400 may be the base station 11, and the transceiver 401 may be the mobile unit 20. It should be understood, however, that the roles of the two transceivers may be reversed. It is further assumed that the transceivers 400 and 401 can communicate via a full-duplex radio channel. For this purpose, the transceiver 400 has a receiver 410 for receiving radio signals transmitted by the transceiver 401 on a first frequency band, and a transmitter 412 for transmitting radio signals to the transceiver 401 on a second frequency band. Similarly, the transceiver 401 has a receiver 450 for receiving radio signals transmitted by the transceiver 400 on the second frequency band, and a transmitter 452 for transmitting radio signals on the first frequency band.

The transceiver 401 has an antenna 455 connected to the receiver 450 and the transmitter 452. Connected to the antenna 455 is a pilot signal generator 460 which generates pilot signals which are transmitted from the transceiver 401 at a predetermined power level. The transceiver 401 also has a memory unit 465 for storing information, such as power control data received from the transceiver 400 or calculated in the transceiver 401. The memory unit 465 is connected to the receiver 450. In the first embodiment shown in FIG. 5, the memory unit 465 has files 466–468 for storing, respectively, a calculated signal path gain, a measured co-channel interference power level, and a pre-fixed target value of the CIR.

The memory unit 465 is also connected to a general purpose processor 475, such as a central processing unit. The processor 475 is programmed with a function 476 to retrieve the power control data currently stored in the memory unit 465 in response to electrical signals received from a clock or timing mechanism 472. The clock mechanism 472 typically provides signals to the processor 475 at an approximately constant rate. The clock mechanism 472 may, however, be an inexpensive non-synchronous timing device. The processor 475 also is programmed with a function 477 to calculate the product of the pre-fixed target value of the CIR, the measured co-channel interference power level, and the reciprocal of the calculated signal path gain. The processor 475 is further programmed with a function 478 to determine whether the calculated product is greater than a maximum permissible power or less than a minimum permissible power. The processor 475 modifies the calculated product by setting it equal to the maximum permissible value if the calculated product is greater than the maximum permissible value. Similarly the processor 475 modifies the calculated product by setting it equal to the minimum permissible value if the calculated product is less than the minimum permissible value. Otherwise, the processor 475 does not change the value of the calculated product.

An output of the processor 475 is connected to transmission power control circuitry 471. The transmission power control circuitry 471, which is connected to the transmitter 452, regulates the power of signals transmitted by the transmitter 452 according to the value determined by the functions 477 and 478. The result is that the transmission power control circuitry 471 regulates the power of the signals transmitted by the transmitter 452 such that the power of the signals transmitted by the transmitter 452 multiplied by the gain of the antenna 455 is equal to the value of the product previously calculated by the processor 475 when the calculated product is within the range of the maximum and minimum power levels.

The transceiver 400 also has an antenna 415 connected to the receiver 410 and the transmitter 412. The antenna 415 has a pre-determined gain. Also connected to the antenna 415 is pilot signal power detector circuitry 420 for detecting the received power level of pilot signals transmitted by the transceiver 401. Co-channel interference power (CCIP) detector circuitry 421 for detecting the power level of the co-channel interference at the receiver 410 is also connected to the receiver 410. A memory unit 425 is connected to the pilot signal power detector 420 and the co-channel interference power detector 421. The memory unit 425 has a file 426 for storing the current value of the received pilot signal power level and a file 427 for storing the co-channel interference power level. The memory unit 425 also has files 428-430 for storing, respectively, the pre-determined pilot signal power level transmitted by the transceiver 401, the value of the gain of the antenna 415, and the pre-fixed target value of the CIR.

A general purpose processor 435, such as a central processing unit, is connected to the memory unit 425 and the transmitter 412. The processor 435 is programmed with a function 436 to retrieve information stored in the memory unit 425. The processor 435 is also programmed with a function 437 to calculate a signal path gain based upon the received pilot signal power level as explained above. The processor 435 is further programmed with a function 438 to instruct the transmitter 412 to transmit power control data, including the pre-fixed target value of the CIR, the measured co-channel interference power level, and the calculated signal path gain, to the transceiver 401.

Figure 6:
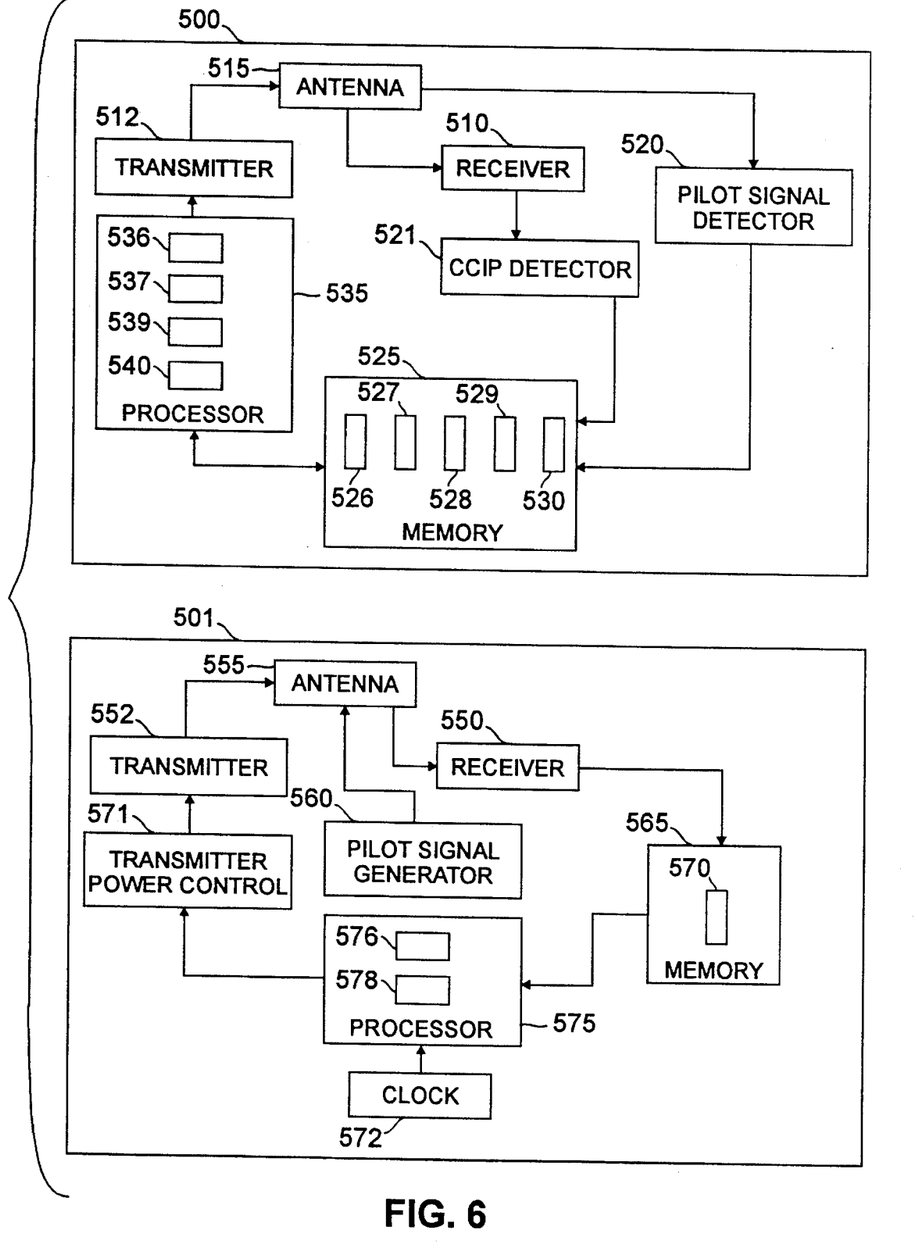
FIG. 6 shows a second embodiment of an exemplary mobile and base station pair according to the present invention.

FIG. 6 illustrates a second embodiment of an exemplary pair of transceivers 500 and 501. As with the pair of transceiver 400 and 401, each of the transceivers 500 and 501 may be one of the base stations and mobile units in the system 1, respectively. As before, it is assumed that the transceivers 500 and 501 can communicate via a full-duplex radio channel. Also, it is to be understood that the role of the two transceivers 500 and 501 may be reversed. A primary difference between the two embodiments is which transceiver in the pair of transceivers has elements for calculating the product of a pre-fixed target value of the CIR, a measured co-channel interference power level, and a calculated signal path gain.

The transceiver 500 has a receiver 510 for receiving radio signals transmitted by the transceiver 501 on a first frequency band, and a transmitter 512 for transmitting radio signals to the transceiver 501 on a second frequency band. Similarly, the transceiver 501 has a receiver 550 for receiving radio signals transmitted by the transceiver 500 on the second frequency band, and a transmitter 552 for transmitting radio signals on the first frequency band.

The transceiver 501 has an antenna 555 connected to the receiver 550 and the transmitter 552. Connected to the antenna 555 is a pilot signal generator 560 which generates pilot signals which are transmitted from the transceiver 501 at a predetermined power level. The transceiver 501 also has a memory unit 565 for storing information, such as power control data received from the transceiver 500. The memory unit 565 is connected to the receiver 550 and has a file 570 for storing a product calculated by multiplying together a pre-fixed target value of the CIR, the reciprocal of the calculated signal path gain, and a measured co-channel interference power level. In this second embodiment, the product is stored in the file 570 after being transmitted from the transceiver 500 to the transceiver 501.

A processor 575, such as a central processing unit, is programmed with a function 576 to retrieve the contents of the file 570 in response to signals from a clock mechanism 572 which may be identical to the clock mechanism 472. As in the first embodiment, the processor 575 is programmed with a function 578 to determine whether the value retrieved from the file 570 is greater than a maximum permissible power or less than a minimum permissible power. The processor 575 is further programmed to modify the retrieved value by setting it equal to the maximum permissible power if the retrieved value is greater than the maximum permissible power and by setting it equal to the minimum permissible power if the retrieval value is less than the minimum permissible power. Otherwise, the processor 575 does not change the value retrieved from the file 570.

Also, as in the first embodiment, an output of the processor 575 is connected to transmission power control circuitry 571. The transmission power control circuitry 571 regulates the power of signals transmitted by the transmitter 552 according to the value received from the processor 575. The result is that the transmission power control circuitry 571 regulates the power of the signals transmitted by the transmitter 552 such that the power of the signals transmitted by the transmitter 552 multiplied by the gain of the antenna 555 is equal to the value of the product previously transmitted by the transceiver 500 when the calculated product is within the range of the maximum and minimum power levels.

The transceiver 500 also has an antenna 515, a receiver 510 and a transmitter 512 configured as in the first embodiment. The antenna 515 has a pre-determined gain. Also connected to the antenna 515 is pilot signal power detector circuitry 520 for detecting the received power level of pilot signals transmitted by the transceiver 501. In addition, co-channel interference power (CCIP) detector circuitry 521 is connected to the receiver 510 for detecting the power level of the co-channel interference at the receiver 510. A memory unit 525 is connected to the pilot signal power detector 520 and the co-channel interference power detector 521. The memory unit 525 has a file 526 for storing the current value of the received pilot signal power level and a file 527 for storing the co-channel interference power level. The memory unit 525 also has files 528–530 for storing, respectively, the predetermined pilot signal power level transmitted by the transceiver 501, the value of the gain of the antenna 515, and the pre-fixed target value of the CIR.

A general purpose processor 535, such as a central processing unit, is connected to the memory unit 525 and is programmed with a function 536 to retrieve information stored in the memory unit 525. The processor 535 is also programmed with a function 537 to calculate a signal path gain based upon the received pilot signal power level as explained above. The processor 535 is further programmed with a function 539 to calculate a product by multiplying together the pre-fixed target value of the CIR, the measured co-channel interference power level, and the calculated signal path gain. Finally, the processor 535 is programmed with a function 540 to instruct the transmitter 512 to transmit power control data, including the calculated product, to the transceiver 501.

Although the invention has been described in terms of specific embodiments, as noted above, these embodiments are intended to be illustrative. It will be readily apparent to persons of ordinary skill in the art that departures may be made from the specific embodiments shown and discussed above without departing from the spirit and scope of the invention. The present invention, therefore, is limited only by the appended claims.

I claim:

1. In a digital mobile radio system, a method of regulating the power of signals transmitted by a transmitting unit which is communicating with a corresponding receiving station, the transmitting unit and the corresponding receiving station each having a transmitter and a receiver, said method comprising the steps of:

(a) calculating a signal path gain between the transmitting unit and the corresponding receiving station;

(b) measuring a co-channel interference power level at the corresponding receiving station;

(c) calculating the product of the reciprocal of said signal path gain, said co-channel interference power level, and a pre-fixed value which corresponds to a minimum target value of the ratio of a received carrier power and a co-channel interference power;

(d) regulating the power of signals transmitted by the transmitting unit according to the value of said product; and (e) repeatedly performing the steps (a), (b), (c) and (d) wherein the duration between successive performances of the step of regulating the power of signals varies.

2. The method of claim 1 wherein the step of calculating a signal path gain comprises the steps of:

generating a pilot signal at a predetermined power level for transmission from the transmitting unit to the corresponding receiving station;

measuring at the corresponding receiving station a received power level based upon said pilot signal; and multiplying together the reciprocal of the predetermined power level of the pilot signal, the received power level measured at the corresponding receiving station, and the reciprocal of a gain associated with the corresponding receiving station.

3. The method of claim 2 further comprising the step of transmitting power control data from the corresponding receiving station to the transmitting unit.

4. The method of claim 3 wherein the step of calculating said product is performed in the corresponding receiving station and wherein said power control data includes said product.

5. The method of claim 3 wherein said power control data includes said signal path gain, said co-channel interference power level, and said pre-fixed value, and wherein the step of calculating said product is performed in the transmitting unit.

6. The method of claim 2 wherein the step of regulating the power of signals transmitted by the transmitting unit according to the value of said product includes the step of setting the power of signals transmitted by the transmitting unit equal to said product.

7. The method of claim 2 wherein the step of regulating the power of signals transmitted by the transmitting unit according to the value of said product includes the steps of:

setting the power of signals transmitted by the transmitting unit equal to said product if said product is less than a maximum permissible power and greater than a minimum permissible power;

setting the power of signals transmitted by the transmitting unit equal to said maximum permissible power if said product is equal to or greater than said maximum permissible power; and setting the power of signals transmitted by the transmitting unit equal to said minimum permissible power if said power is equal to or less than said minimum permissible power.

8. In a digital mobile radio system, a method of regulating the power of signals transmitted by a plurality of transmitting units, where each of said transmitting units is communicating with a corresponding one of a plurality of receiving stations via the same digital radio channel, each of said plurality of transmitting units and receiving stations having a transmitter and a receiver, said method comprising the steps of:

(a) performing for each one of said plurality of transmitting units the steps of:

(i) calculating a signal path gain between the transmitting unit and the corresponding receiving station;

(ii) measuring a co-channel interference power level at the corresponding receiving station;

(iii) calculating the product of the reciprocal of said signal path gain, said co-channel interference power level, and a pre-fixed value which corresponds to a minimum target value of the ratio of a received carrier power and a co-channel interference power; and (iv) regulating the power of signals transmitted by the transmitting unit according to the value of said product; and (b) repeatedly performing the steps (i), (ii), (iii) and (iv) with respect to each one of said plurality of transmitting units in an asynchronous manner.

9. The method of claim 8 wherein the duration between successive performances of the step of regulating the power of signals varies with respect to at least one of said plurality of transmitting units.

10. The method of claim 8 wherein there is a phase delay between performances of the step of regulating the power of signals with respect to one of said plurality of transmitting units and performances of the step of regulating the power of signals with respect to at least one other of said plurality of transmitting units.

11. The method of claim 8 wherein repeated performances of the step of regulating the power of signals with respect to one of said plurality of transmitting units takes place at a rate that is different from the rate of repeated performances of the step of regulating the power of signals with respect to at least one other of said plurality of transmitting units.

12. The method of claim 8 wherein (a) the duration between successive performances of the step of regulating the power of signals varies with respect to at least one of said plurality of transmitting units;

(b) there is a phase delay between performances of the step of regulating the power of signals with respect to one of said plurality of transmitting units and performances of the step of regulating the power of signals with respect to at least one other of said plurality of transmitting units; and (c) repeated performances of the step of regulating the power of signals with respect to one of said plurality of transmitting units takes place at a rate that is different from the rate of repeated performances of the step of regulating the power of signals with respect to at least one other of said plurality of transmitting units.

13. The method of claim 8 wherein the step of calculating a signal path gain includes the steps of:

generating a pilot signal at a predetermined power level for transmission from the transmitting unit to the corresponding receiving station;

measuring at the corresponding receiving station a received power level based upon said pilot signal; and multiplying together the reciprocal of the predetermined power level of the pilot signal, the received power level measured at the corresponding receiving station, and the reciprocal of a gain associated with the corresponding receiving station.

14. The method of claim 13 further including the step of transmitting power control data from the corresponding receiving station to the transmitting unit.

15. The method of claim 14 wherein the step of calculating said product is performed in the corresponding receiving station and wherein said power control data includes said product.

16. The method of claim 14 wherein said power control data includes said signal path gain, said co-channel interference power level, and said pre-fixed value, and wherein the step of calculating said product is performed in the transmitting unit.

17. The method of claim 13 wherein the step of regulating the power of signals transmitted by the transmitting unit according to the value of said product includes the step of setting the power of signals transmitted by the transmitting unit equal to said product.

18. The method of claim 13 wherein the step of regulating the power of signals transmitted by the transmitting unit according to the value of said product includes the steps of:

setting the power of signals transmitted by the transmitting unit equal to said product if said product is less than a maximum permissible power and greater than a minimum permissible power;

setting the power of signals transmitted by the transmitting unit equal to said maximum permissible power if said product is equal to or greater than said maximum permissible power; and setting the power of signals transmitted by the transmitting unit equal to said minimum permissible power if said power is equal to or less than said minimum permissible power.

19. A cellular radio system arranged for distributed power control and using a duplex radio channel having first and second frequency bands, said cellular radio system comprising:

a first transceiver comprising:
(a) a receiver for receiving radio signals transmitted in said first frequency band;
(b) a transmitter for transmitting radio signals in said second frequency band;
(c) an antenna having an antenna gain; and
(d) co-channel interference power level circuitry for measuring a co-channel interference power level at the receiver of said first transceiver;

a second transceiver comprising:
(a) a receiver for receiving radio signals transmitted in said second frequency band;
(b) a transmitter for transmitting radio signals in said first frequency band;
(c) a memory unit for storing power control data;
(d) a clock mechanism; and
(e) an antenna;

means for calculating a signal path gain for a signal transmitted from said second transceiver to said first transceiver; and means for calculating the product of (i) the reciprocal of said signal path gain, (ii) said co-channel interference power level, and (iii) a pre-fixed value which corresponds to a minimum target value of the ratio of a received carrier power and a co-channel interference power;

and wherein said second transceiver further comprises transmission power control circuitry for regulating, according to said product, the power of signals transmitted by the transmitter in said second transceiver at a rate determined by said clock mechanism.

20. The system of claim 19 wherein the means for calculating a signal path gain comprises:

a pilot signal generator in said second transceiver for generating pilot signals which are transmitted at a pre-determined power by said second transceiver;

pilot signal detector circuitry connected to the antenna in said first transceiver for detecting a received power level based upon a pilot signal transmitted by said second transceiver;

a memory unit in said first transceiver for storing the pre-determined power level of pilot signals transmitted by said second transceiver and for storing said antenna gain; and a processor in said first transceiver programmed to multiply together the reciprocal of the pre-determined power level of said pilot signals, the received power level detected by said pilot signal detector circuitry, and the reciprocal of the antenna gain.

21. The system of claim 20 wherein the means for calculating said product comprises:

a memory unit in said first transceiver for further storing the pre-fixed target value of the ratio of carrier power to co-channel interference power, a co-channel interference power level measured by said co-channel interference power level circuitry, and a signal path gain calculated by said means for calculating a signal path gain;

the processor in said first transceiver further programmed to perform the following functions:

(a) retrieve from the memory unit in said first transceiver the pre-fixed target value of the ratio of carrier power to co-channel interference power, the co-channel interference power level measured by said co-channel interference power level circuitry, and the signal path gain calculated by said means for calculating a signal path gain; and (b) instruct the transmitter in said first transceiver to transmit the pre-fixed target value of the ratio of carrier power to co-channel interference power, the co-channel interference power level measured by said co-channel interference power level circuitry, and the signal path gain calculated by said means for calculating a signal path gain; and a processor in said second transceiver programmed to multiply together (i) the pre-fixed target value of the ratio of carrier power to co-channel interference power, (ii) the co-channel interference power level measured by said co-channel interference power level circuitry, and (iii) the signal path gain calculated by said means for calculating a signal path gain.

22. The system of claim 20 wherein the means for calculating said product comprises:

a memory unit in said first transceiver for further storing the pre-fixed target value of the ratio of carrier power to co-channel interference power, a co-channel interference power level measured by said co-channel interference power level circuitry, and a signal path gain calculated by said means for calculating a signal path gain;

the processor in said first transceiver, where said processor is further programmed to perform the following functions:

(a) retrieve from the memory unit in said first transceiver the pre-fixed target value of the ratio of carrier power to co-channel interference power, the co-channel interference power level measured by said co-channel interference power level circuitry, and the signal path gain calculated by said means for calculating a signal path gain; and (b) multiply together the pre-fixed target value of the ratio of carrier power to co-channel interference power, the co-channel interference power level measured by said co-channel interference power level circuitry, and the signal path gain calculated by said means for calculating a signal path gain.

23. In a digital mobile radio system, a method of regulating the power of signals transmitted by a plurality of transmitting units, where each of said transmitting units is communicating with a corresponding one of a plurality of receiving stations via the same digital radio channel, each of said plurality of transmitting units and receiving stations having a transmitter and a receiver, said method of comprising the steps of:

(a) performing for each one of said pluralaity of transmitting units the steps of:

(i) calculating a signal path gain between the transmitting unit and the corresponding receiving station;

(ii) measuring a co-channel interference power level at the corresponding receiving station;

(iii) calculating the product of the reciprocal of said signal path gain, said co-channel interference power level, and a pre-fixed value which corresponds to a minimum target value of the ratio of a received carrier power and a co-channel interference power; and (iv) regulating the power of signals transmitted by the transmitting unit according to the value of said product; and (b) repeatedly performing the steps (i), (ii), (iii) and (iv) with respect to each one of said plurality of transmitting units in a manner not requiring synchrony or coordination among the plurality of transmitting units.

* * * * *